UNITED STATES PATENT OFFICE.

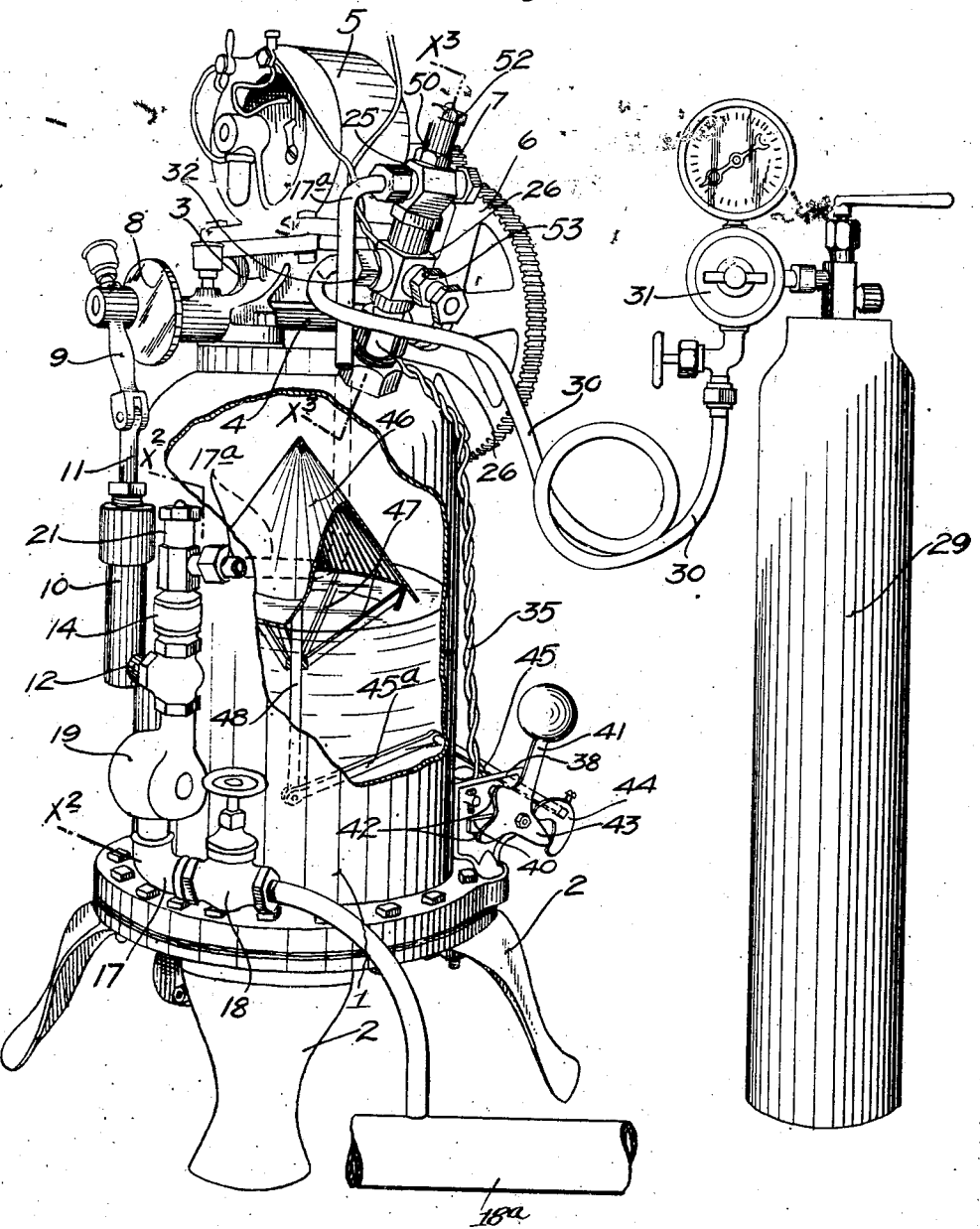

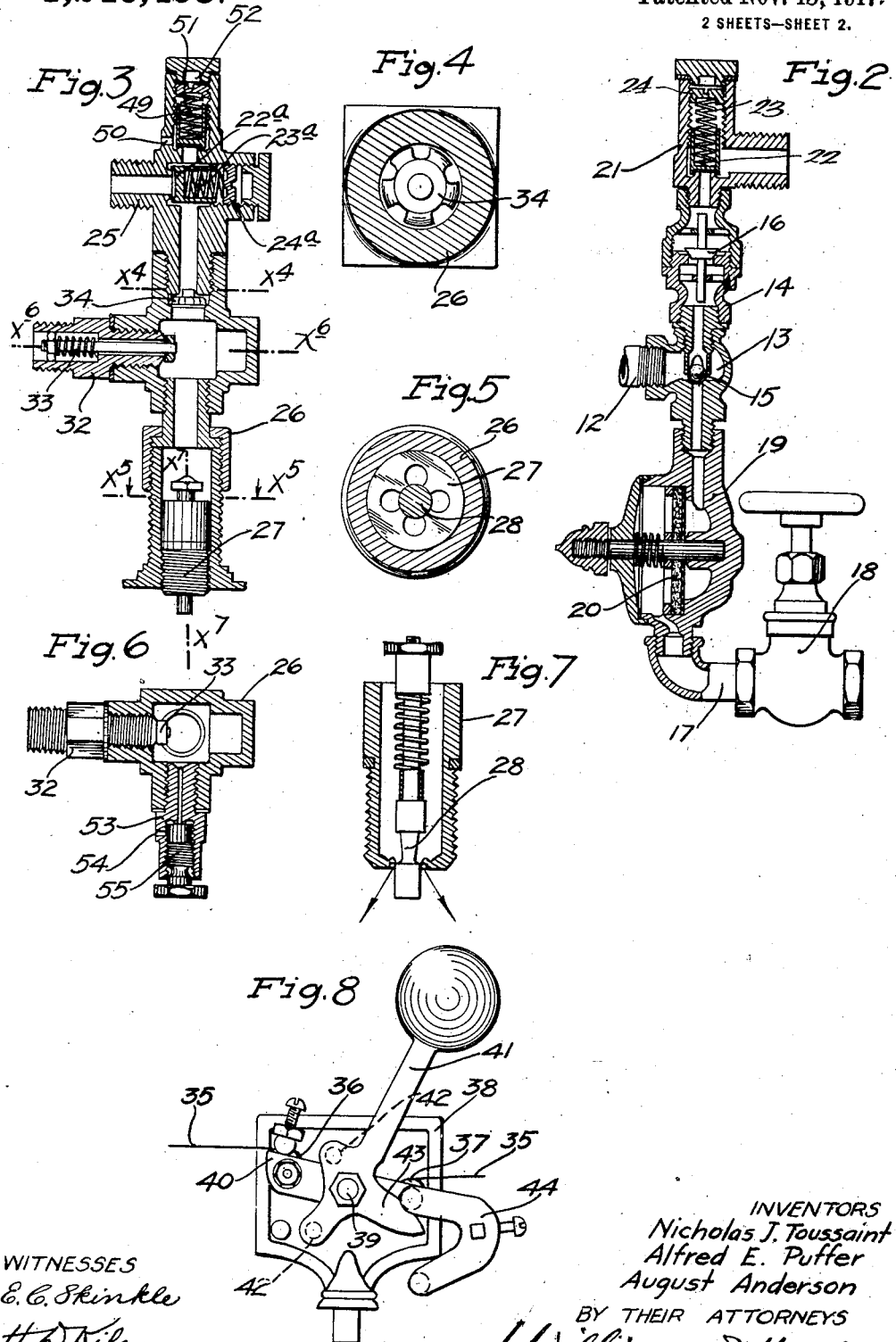

NICHOLAS J. TOUSSAINT, ALFRED E. PUFFER, AND AUGUST ANDERSON, OF MINNEAPOLIS, MINNESOTA.

CARBONATOR.

1,246,498.  Specification of Letters Patent.  Patented Nov. 13, 1917.

Application filed July 9, 1914.  Serial No. 849,881.

*To all whom it may concern:*

Be it known that we, NICHOLAS J. TOUSSAINT, ALFRED E. PUFFER, and AUGUST ANDERSON, citizens of the United States, residing at Minneapolis, in the county of Hennepin and State of Minnesota, have invented certain new and useful Improvements in Carbonators; and we do hereby declare the following to be a full, clear, and exact description of the invention, such as will enable others skilled in the art to which it appertains to make and use the same.

Our invention relates to the carbonaters and has for its particular object the provision of an improved apparatus for charging water with carbonic acid gas for use at soda water fountains and elsewhere; and generally stated, the invention consists of the novel device and combinations of devices hereinafter described and defined in the claims.

In the accompanying drawings which illustrate the complete apparatus in its preferred form, like characters indicate like parts throughout the several views.

Referring to the drawings:

Figure 1 is a perspective view with some parts broken away, showing the complete carbonating apparatus;

Fig. 2 is a vertical section taken approximately on the line $x^2$ $x^2$ on Fig. 1;

Fig. 3 is a vertical section taken approximately on the line $x^3$ $x^3$ on Fig. 1;

Fig. 4 is a section on the line $x^4$ $x^4$ on Fig. 3;

Fig. 5 is a section on the line $x^5$ $x^5$ on Fig. 3;

Fig. 6 is a section on the line $x^6$ $x^6$ on Fig. 3;

Fig. 7 is a detail in section on the line $x^7$ $x^7$ on Fig. 3; and

Fig. 8 is a detail of the float-actuated water circuit switch.

The tank 1 of the carbonator is preferably of drawn pressed steel and seamless, and, as shown, is supported on suitable legs 2. Secured on the closed top of this tank 1 is a casting 3 which affords a bearing for the crank shaft 4, and a supporting base for an electric motor 5. At one end, the shaft 4 has a larger spur gear 6 that meshes with a pinion 7, (see Fig. 1), on the motor shaft. At its other end, the said shaft 4 is provided with a crank, as shown, in the form of a disk 8, the wrist pin of which is connected by a crank rod 9 to the projecting stem of a cylinder piston motor pump made up of a pump cylinder or casing 10 and coöperating piston 11. The pump cylinder 10 is suitably secured on the side of the tank 1, and is connected by a short pipe 12 to a chamber 13 of a check valve casing 14. This check valve casing, as shown, is made up of several parts, (see particularly Fig. 2) and it is provided with two check valves 15 and 16. These check valves 15 and 16 form part of the pump mechanism, and they operate in the usual way, under reciprocations of the pump piston 11 to cause an upward flow of water through the said casing 14. More specifically stated, the check valve 15 opens under upward movement of the pump piston 11 to permit water to be drawn upward into the pump cylinder, and under downward strokes of the said pump piston, closes so that the pressure of the water will be upward on the check valve 16, and unseating the said valve 16, will flow freely upward past the said valve.

The water supply pipe 17 is preferably provided with a globe valve 18, and may be assumed to be connected to a city water main as a source of water supply. In fact, one of the important features of the present invention is based on the assumption that the said water supply pipe is to be connected to a city water system or other continuous source of supply under pressure, such as a city water main 18ª diametrically indicated in Fig. 1. The water from the supply pipe 17, in passing to the valve casing 14, is passed through a filter, the casing 19 of which is shown as directly connected between the said parts 14 and 17. Within the filter casing 19, interposed between the inlet and outlet ports thereof, is a filtering disk or plate 20. The construction of this filter, *per se*, is not herein claimed, and hence, its details are not important for the purpose of this case.

Secured on top of the valve casing 14 is a pressure resisting valve, the casing 21 of which, as shown, is in the form of an elbow having two threaded nipples, one of which is screwed into the top of the casing 14, and the other of which is connected to a water delivery pipe 17ª. Within the valve casing 21 is a sort of a choke valve 22 that is subject to a spring 23 and to a spring adjusting plug 24, the latter of which has screw threaded engagement with the interior of the said casing 21. By adjustments of the plug 24, the valve 22 may be so set that it will open under any desired pressure. Here it may be stated that it should be set to open only under a pressure which is considerably greater than the maximum city water pressure, or pressure under which the water is delivered into the supply pipe 17. A water delivery pipe 17$^a$ is connected to one threaded nipple 25 of a sectional valve casing 26, which valve casing, at its lower end, is attached to and has communication with the top of the tank 1. Within the casing 26 is a yieldingly closed check valve 22$^a$, spring 23$^a$ and adjusting plug 24$^a$, the construction and operation of which is similar to that of the above described parts 22, 23, 24, except that the said valve 22$^a$ is preferably set to open under a very much lighter pressure, its only function being to prevent gas from following the pipe 17$^a$ back to the pump. In the lower end or delivery end of the case 26 is an atomizer or spraying device shown as in the form of a bushing 27 and a yieldingly closed spraying valve 28, which valve opens under a combined water and gas pressure to which it is subjected.

The gas for charging the water, may, of course, be supplied in different ways, but preferably, is supplied from an ordinary steel bottle 29 having the customary delivery pipe 30 and pressure reducing valve mechanism 31. The gas delivery pipe 31 is arranged to be attached to a threaded sleeve 32, which, as best shown in Fig. 3, is screwed into an intermediate laterally projecting hub of the valve casing 26, and is provided with a laterally closed check valve 33. Preferably, a check valve 34 is also placed in the casing 26 between the valves 22$^a$ and 33.

The check valve 34 checks against an upward flow of gas when one or both of the valves 22$^a$ and 49 leak, or are removed.

The electric motor 5 is connected in an operating circuit 35, the wires of which are connected, one to a contact 36 and the other to a contact 37, both secured to, but insulated from a bracket 38 secured on the base of the tank 1. Intermediately pivoted on a stud 39 on the bracket 38 is a switch lever 40 which, in the position shown in Fig. 8, closes the motor circuit. Also, pivoted on the stud 39 is a weighted lever 41 that is provided with lateral projections 42 and the projecting arm 43. The arm 43 is arranged to be engaged by the arms of a forked head 44 carried by a rock shaft 45, suitably journaled on the bracket 38 and extending into the tank 1 and provided at its inner end with an arm 45$^a$, to which latter a switch operating float is attached. This float is a non-collapsible structure and is made very much of the form of an umbrella. More definitely stated, it comprises a conical shell 46 that is open at its bottom and is connected by radial arms 47 to a central stem 48, the lower end of which stem is pivotally attached to said arm 45. This float can never become loaded with water and cannot be collapsed. Under increasing pressure in the tank, the water will be simply forced higher and higher, up into the conical body of the float, and under decreasing pressure will fall lower and lower therein.

To illustrate the relative settings of the several valves above described, let it be assumed that the water supply pipe 17 receives water from the city main at approximately eighty pounds pressure per square inch; that the valve 31 is set for delivery of gas from the bottle 29 into the tank 1 at approximately one hundred and fifty pounds per square inch; and that the power of the electric motor 5 is sufficient to operate the pump 10—11 for delivery of water through the pipe 17$^a$ at a pressure of approximately five hundred pounds. Under these conditions, the so-called choke valve 22 should be set to open only under a pressure of approximately one hundred pounds per square inch. This will positively prevent flooding of the tank 1 by water which would otherwise be delivered into the said tank through the pipes 17—17$^a$ at times when the pressure in the said tank 1 is below eighty pounds. This relative setting of the said valve 22, in respect to the continuous pressure or current of water pressure in the pipe 17, is therefore very important.

When the switch lever 40 is in the position shown in Fig. 8, the motor circuit will be closed and the pump 10—11 will be operated and caused to force water through the pipes 17—17$^a$ under a pressure which exceeds the assumed pressure of one hundred pounds, under which the choke valve 22 is held closed. The water thus delivered into the tank 1 will pass through the valve casing 26 where it is commingled with the incoming gas, and will pass with the gas through the atomizer or spraying device 27—28 and will thereby, be thoroughly carbonated. When the carbonated water in the tank 1 rises above a predetermined level therein, the float acts through the arm 45$^a$, rock shaft 45 and lower arm of the forked head 44, through the weighted lever 41 to the left or side of its dead center position, and thereby causes the upper lug 42 of the said lever 41 to engage the switch lever 40 and move the same into a position to open the motor circuit. This opening of the motor circuit will, of course, throw the motor out of action and stop the pump. When the level of the water of the tank 1 falls below the predetermined point, the float in lowering, will cause the upper arm of the forked head 44 to force the weighted lever 41 back into the position shown in Fig. 8, and thereby again close the motor circuit with the obvious result that the pump will again be thrown into action.

If the float actuated switch, in controlling the motor, should get out of action at a time when the motor circuit is closed, the pump would continue to operate up to the assumed pressure of said five hundred pounds, and then if there was no relief of pressure, and the motor circuit was left closed, the motor would be ultimately stopped and burned out by the great resistance. To prevent this, a safety valve is provided. This safety valve 49, as shown, is set in the top of the valve casing 26 and normally cuts off discharge through a relief port 50. The said valve 49, as shown, is of the same construction as the valves 22 and 22ª, and like the said valves, is subject to a spring 51 and to an adjusting plug 52 applied in the upper end of the said casing 26. The safety valve 49 is set to open under a pressure greater than that required to open the choke valve and less than that required to stop the action of the motor.

As best shown in Fig. 6, and also in Fig. 1, the valve casing 26 is provided with a laterally projecting nipple 53 having a blow-off port 54 normally closed by a valve 55, as shown, seated with threaded engagement within the said nipple. The blow-off port 54, when open, permits the discharge of air in the initial starting of the apparatus, and also permits the blowing off of gas at other times if it should become desirable, or necessary.

What we claim is:

1. In an apparatus for charging liquid with gas, the combination with a tank, of connections for supplying water thereto, including a water supply conduit, a pump connected to said supply conduit and a choke valve in said conduit, said conduit being subject to an approximately constant pressure such as that of a city water main, said choke valve being set to open only under a pressure exceeding the said constant supply pressure in said pipe, and the said pump operating to force water through said pipe into said tank under a pressure exceeding the pressure under which said choke valve is closed, and means for supplying gas into said tank.

2. In an apparatus for charging liquid with gas, the combination with a tank, of connections for supplying water thereto, including a water supply conduit, a pump connected to said supply conduit and a choke valve in said conduit, said conduit being subject to an approximately constant pressure such as that of a city water main, said choke valve being set to open only under a pressure exceeding the said constant supply pressure in said pipe, the said pump operating to force water through said pipe into said tank under a pressure exceeding the pressure under which said choke valve is closed, and a yieldingly closed safety valve in said conduit set to open under a pressure greatly in excess of that required to open the said choke valve, and means for supplying gas into said tank.

3. In an apparatus for charging liquid with gas, the combination with a tank, of connections for supplying water thereto, including a water supply conduit, a pump connected to said supply conduit and a choke valve in said conduit, said conduit being subject to an approximately constant pressure such as that of a city water main, said choke valve being set to open only under a pressure exceeding the said constant supply pressure in said pipe, the said pump operating to force water through said pipe into said tank under a pressure exceeding the pressure under which said choke valve is closed, a gas supply pipe delivering into said water conduit and provided with its own check valve, and an atomizing device at the point of delivery of said water conduit into said tank.

4. In an apparatus for charging liquid with gas, the combination with a tank, of connections for supplying water thereto, including a water supply conduit, a pump connected to said supply conduit and a choke valve in said conduit, said conduit being subject to an approximately constant pressure such as that of a city water main, said choke valve being set to open only under a pressure exceeding the said constant supply pressure in said pipe, the said pump operating to force water through said pipe into said tank under a pressure exceeding the pressure under which said choke valve is closed, an electric motor having connections for driving said pump, an electric circuit including a switch for controlling said motor, and a float within said tank having connections for operating said switch, and means for supplying gas into said tank.

5. In an apparatus for charging liquid with gas, the combination with a tank, of connections for supplying water thereto, including a water supply conduit, a pump connected to said supply conduit and a choke valve in said conduit, said conduit being subject to an approximately constant pressure such as that of a city water main, said choke valve being set to open only under a pressure exceeding the said constant supply pressure in said pipe, the said pump operating to force water through said pipe into said tank under a pressure exceeding the pressure under which said choke valve is closed, a gas supply connection leading to said water conduit near the point of its delivery into said tank, and a check valve in said water conduit for preventing the passage of gas into the main body portion of said water conduit.

6. In an apparatus for charging liquid with gas, the combination with a tank, of connections for supplying water thereto, including a water supply conduit, a pump connected to said supply conduit and a choke valve in said conduit, said conduit being subject to an approximately constant pressure such as that of a city water main, said choke valve being set to open only under a pressure exceeding the said constant supply pressure in said pipe, the said pump operating to force water through said pipe into said tank under a pressure exceeding the pressure under which said choke valve is closed, a gas supply connection leading to said water conduit near the point of its delivery into said tank, a check valve in said water conduit for preventing the passage of gas into the main body portion of said water conduit, a motor for driving said pump, means operated by the rise and fall of liquid within said tank, for starting and stopping said motor, and a safety valve in said water conduit arranged to open under a pressure greater than that required to open said choke valve and less than that required to stop the action of said motor.

In testimony whereof we affix our signatures in presence of two witnesses.

NICHOLAS J. TOUSSAINT.
ALFRED E. PUFFER.
AUGUST ANDERSON.

Witnesses:
B. G. WHEELER,
HARRY D. KILGORE.

Copies of this patent may be obtained for five cents each, by addressing the "Commissioner of Patents, Washington, D. C."